(12) United States Patent
Ward (10) Patent No.: US 7,343,134 B1
(45) Date of Patent: *Mar. 11, 2008

(54) SYSTEM AND METHOD FOR COMMUNICATING WITH STUDENTS IN AN EDUCATION ENVIRONMENT

(75) Inventor: Darrell L. Ward, Denton, TX (US)

(73) Assignee: Einstruction Corporation, Denton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/118,682

(22) Filed: Apr. 29, 2005

Related U.S. Application Data (63) Continuation of application No. 10/004,949, filed on Dec. 3, 2001, now Pat. No. 6,895,213.

(51) Int. Cl.
*G09B 3/00* (2006.01)

(52) U.S. Cl. .................................. 434/350; 434/322

(58) Field of Classification Search ................ 434/188, 434/322, 350
See application file for complete search history.

(56) References Cited

U.S. PATENT DOCUMENTS

| | | | |
|---|---|---|---|
| 3,245,157 A | 4/1966 | Laviana | 35/9 |
| 3,416,243 A | 12/1968 | Greenberg et al. | 35/48 |
| 3,676,939 A | 7/1972 | Oberst et al. | 35/48 R |
| 3,699,667 A | 10/1972 | Gomez | 35/9 B |
| 3,762,072 A | 10/1973 | From | 35/48 R |
| 4,055,906 A | 11/1977 | Thompson | 35/9 A |
| 4,715,818 A | 12/1987 | Shapiro et al. | 434/118 |
| 4,764,120 A | 8/1988 | Griffin et al. | 434/336 |
| 5,002,491 A | 3/1991 | Abrahamson et al. | 434/322 |
| 5,035,422 A | 7/1991 | Berman | 273/439 |
| 5,226,177 A | 7/1993 | Nickerson | 455/2 |
| 5,273,437 A | 12/1993 | Caldwell et al. | 434/351 |
| 5,344,326 A | 9/1994 | Ferris | 434/336 |
| 5,379,213 A | 1/1995 | Derks | 364/411 |
| 5,537,141 A | 7/1996 | Harper et al. | 348/12 |
| 5,586,889 A | 12/1996 | Goodman | 434/327 |
| RE35,449 E | 2/1997 | Derks | 395/800 |
| 5,724,357 A | 3/1998 | Derks | 370/413 |
| 5,736,984 A | 4/1998 | Jellinek et al. | 345/710 |
| 5,788,508 A | 8/1998 | Lee et al. | 434/350 |
| 5,823,788 A | 10/1998 | Lemelson et al. | 434/350 |
| 5,827,070 A | 10/1998 | Kershaw et al. | 434/322 |

(Continued)

OTHER PUBLICATIONS

Qwizdom, Inc., "Defendant Qwizdom Inc.'s Preliminary Invalidity Contentions," *eInstruction Corp. v. Qwizdom, Inc.*, No. 05-CV-0470-LED, 8 pages, Service Date Jun. 13, 2006.

(Continued)

*Primary Examiner*—Xuan M. Thai
*Assistant Examiner*—Cameron Saadat
(74) *Attorney, Agent, or Firm*—Baker Botts L.L.P.

(57) ABSTRACT

A communication system for communicating with students in an education environment includes a plurality of remote units, a base station that receives messages from the remote units, a processor, a memory, and a display simultaneously visible to all users of the remote units. The base station receives a response to a current question from a remote unit. The processor determines whether the current response is a valid response, and uses the display to visually indicate to a user of the remote unit whether the response is valid.

32 Claims, 4 Drawing Sheets

U.S. PATENT DOCUMENTS

| | | | | |
|---|---|---|---|---|
| 5,842,869 | A | 12/1998 | McGregor et al. | 434/201 |
| 5,842,871 | A | 12/1998 | Cutler et al. | 434/335 |
| 5,947,747 | A | 9/1999 | Walker et al. | 434/354 |
| 6,021,119 | A | 2/2000 | Derks et al. | 370/261 |
| 6,039,575 | A | 3/2000 | L'Allier et al. | 434/323 |
| 6,086,381 | A | 7/2000 | Downs et al. | 434/322 |
| 6,112,049 | A | 8/2000 | Sonnenfeld | 434/350 |
| 6,164,974 | A | 12/2000 | Carlile et al. | 434/322 |
| 6,173,154 | B1 | 1/2001 | Kucinski et al. | 434/359 |
| 6,181,910 | B1 | 1/2001 | Jerrold-Jones et al. | 434/353 |
| 6,208,832 | B1 | 3/2001 | Remschel | 434/350 |
| 6,288,753 | B1 | 9/2001 | DeNicola et al. | 348/586 |
| 6,289,222 | B1 | 9/2001 | Cure et al. | 455/458 |
| 6,302,698 | B1 | 10/2001 | Ziv-El | 434/323 |
| 6,704,541 | B1 | 3/2004 | Ciarallo et al. | 434/362 |

OTHER PUBLICATIONS

Beyond Question Learning Technologies, Inc., "Plantiff's Preliminary Invalidity Contentions," *Beyond Question Learning Techs. v. eInstruction Corp.*, No. 3:07-CV-00055-JFA, 26 pages, Service Date Jul. 12, 2007.

Smartroom Learning Solutions, "How Does Beyond Question Work?," http://www.smartroom.com/k12feature.htm, *Beyond Question Learning Techs. v. eInstruction Corp.*, No. 3:07-CV-00055-JFA, 2 pages, Print Date Jul. 11, 2007.

Louis Abrahamson, "How HKUST Institutionalized the PRS," http://www.bedu.com/Newsletterarticle/hkust.html, *Beyond Question Learning Techs. v. eInstruction Corp.*, No. 3:07-CV-00055-JFA, 2 pages, Print Date Jul. 11, 2007.

Varitronix Limited, "Personal Response System User's Manual," *Beyond Question Learning Techs v. eInstruction Corp.*, No. 3:07-CV-00055-JFA, 37 pages, Copyright Date 1997.

"University of Texas El Paso Breaks New Ground," http://www.bedu.com/Newsletterarticle/utepnewground.html, *Beyond Question Learning Techs. v. eInstruction Corp.*, No. 3:07-CV-00055-JFA, 2 pages, Print Date Jul. 11, 2007.

Better Education Inc., "Classtalk Quickstart Manual," *Beyond Question Learning Techs. v. eInstruction Corp.*, No. 3:07-CV-00055-JFA, 23 pages, Review Date Aug. 16, 1999.

LA, bE staff, "'Wireless'—at last!!," http://www.bedu.com/Newsletterarticle/wirelessatlast.html, *Beyond Question Learning Techs. v. eInstruction Corp.*, No. 3:07-CV-00055-JFA, 2 pages, Print Date Jul. 11, 2007.

A. Louis Abrahamson, "An Overview of Teaching and Learning Research with Classroom Communication Systems (CCSs)," *Beyond Question Learning Techs. v. eInstruction Corp.*, No. 3:07-CV-00055-JFA, 4 pages, Service Date Jul. 12, 2007.

Apple Computer, Inc., "Setting Up the AirPort Base Station," *Beyond Question Learning Techs. v. eInstruction Corp.*, No. 3:07-CV-00055-JFA, 21 pages, Copyright Date 1999.

Apple Computer, Inc., "About Your AirPort Card," *Beyond Question Learning Techs. v. eInstruction Corp.*, No. 3:07-CV-00055-JFA, 9 pages, Copyright Date 1999.

"Research and Publications related to Interactive Teaching," http://www.bedu.com/publications.html, *Beyond Question Learning Techs. v. eInstruction Corp.*, No. 3:07-CV-00055-JFA, 6 pages, Print Date Jul. 11, 2007.

"IEEE Xplore: Browse Standards," http://www.ieeexplore.ieee.org/xpl/standards.jsp?findtitle=802.11&letter=802.11, *Beyond Question Learning Techs. v. eInstruction Corp.*, No. 3:07-CV-00055-JFA, 3 pages, Print Date Jul. 11, 2007.

First Star Software, Inc., "Spy v. Spy," Moby Games, www.mobygames.com/game/spy-vs-spy, 20 pages, 1984.

Oxford Digital Enterprises Ltd., "Team Yankee," Moby Games, www.mobygames.com/game/dos/team-yankee, 8 pages, 1990.

SYSTEM AND METHOD FOR COMMUNICATING WITH STUDENTS IN AN EDUCATION ENVIRONMENT

CROSS REFERENCE TO RELATED APPLICATIONS

This application is a continuation of U.S. application Ser. No. 10/004,949, filed Dec. 3, 2001 now U.S. Pat. No. 6,895,213 by Darrell L. Ward and entitled "System and Method for Communicating with Students in an Education Environment".

TECHNICAL FIELD OF THE INVENTION

The present invention relates generally to communication systems for education, and more particularly to a method and system for communicating with students in an education environment.

BACKGROUND OF THE INVENTION

Incorporation of technology into the classroom has been an increasing trend in recent years. Communication systems allow teachers to provide more information to, and receive more feedback from, their students. However, technology has yet to be fully integrated into many traditional classroom areas such as administering examinations. This incomplete integration reduces the overall efficiency of the education process.

SUMMARY OF THE INVENTION

In accordance with the present invention, techniques for communicating with students in an education environment are disclosed. In a particular embodiment, a communication system receives responses in the form of wireless signals from remote units.

In a particular embodiment of the present invention, a method for communicating in an education environment includes determining a current question having a plurality of possible answers and receiving from a remote unit a message which includes a remote unit identifier and a response to the current question. The method also includes determining whether the current response from the remote unit is a valid response matching a possible answer for the selected question. The method further includes visually indicating to a user of the remote unit whether the response is valid or not.

In another embodiment of the present invention, a communication system includes a plurality of remote units, a base station operable to receive messages from the remote units, a processor, a memory and a display simultaneously viewable by the users of the remote units. The memory stores a plurality of possible answers to a plurality of questions. The base station receives messages from the remote units, each message including a remote unit identifier and a current response. The processor determines a current question for each message, and determines whether the current response is valid. The display visually indicates to the users of the remote units whether their respective current responses are valid.

In yet another embodiment of the present invention, a graphical user interface includes a plurality of sections, each section displaying a respective remote unit identifier for a remote unit. Each section includes a first visible indication that can be displayed when a current response received from the remote unit is not a valid response corresponding to a possible answer to a question. Each section also includes a second visible indication that can be displayed when the current response received from the remote unit is a valid response, and no previous response to the question has been received from the remote unit. Each section also includes third and fourth visible indications which can be displayed when a previous answer has been received from the remote unit, and the current response either does or does not match the previous response respectively.

Embodiments of the present invention provide various technical advantages. An important technical advantage of certain embodiments of the present invention is a display simultaneously viewable by all of the users of the remote units of the system. The display visually indicates to each user that the user's response was valid or invalid. This allows a large number of students to respond to questions using only one display, saving the expense of individual displays for each student.

Another technical advantage of certain embodiments is the use of wireless response units. This allows greater flexibility in administration of the examination, and provides advantages such as reduced cheating, ease of administration, and savings of educational resources.

Another technical advantage of certain embodiments of the present invention is asynchronous test administration. This feature allows an examination to be administered through a communication system such that users of a remote units can give responses to different questions during the examination and move from question to question independently. For example, one student might be answering question one, while another is answering question three. Alternatively, a teacher may perform a synchronous examination, which allows the teacher to control the pace and flow of questions.

Yet another technical advantage of certain embodiments of the present invention is the ability of the system to instantly grade responses received from remote units. In a particular embodiment, a communication system can determine that a complete set of valid responses has been received from a remote unit, and then compare the complete set of responses to a set of correct answers. From this comparison, the communication system can determine a score for the complete set of responses rapidly without requiring a teacher to perform the grading.

Additional technical advantages of the present invention will be readily apparent to one skilled in the art. While specific advantages have been enumerated above, various embodiments of the present invention may include all, some, or none of the enumerated advantages. The features and technical advantages of the present invention may be better understood by reference to the following figures, description, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
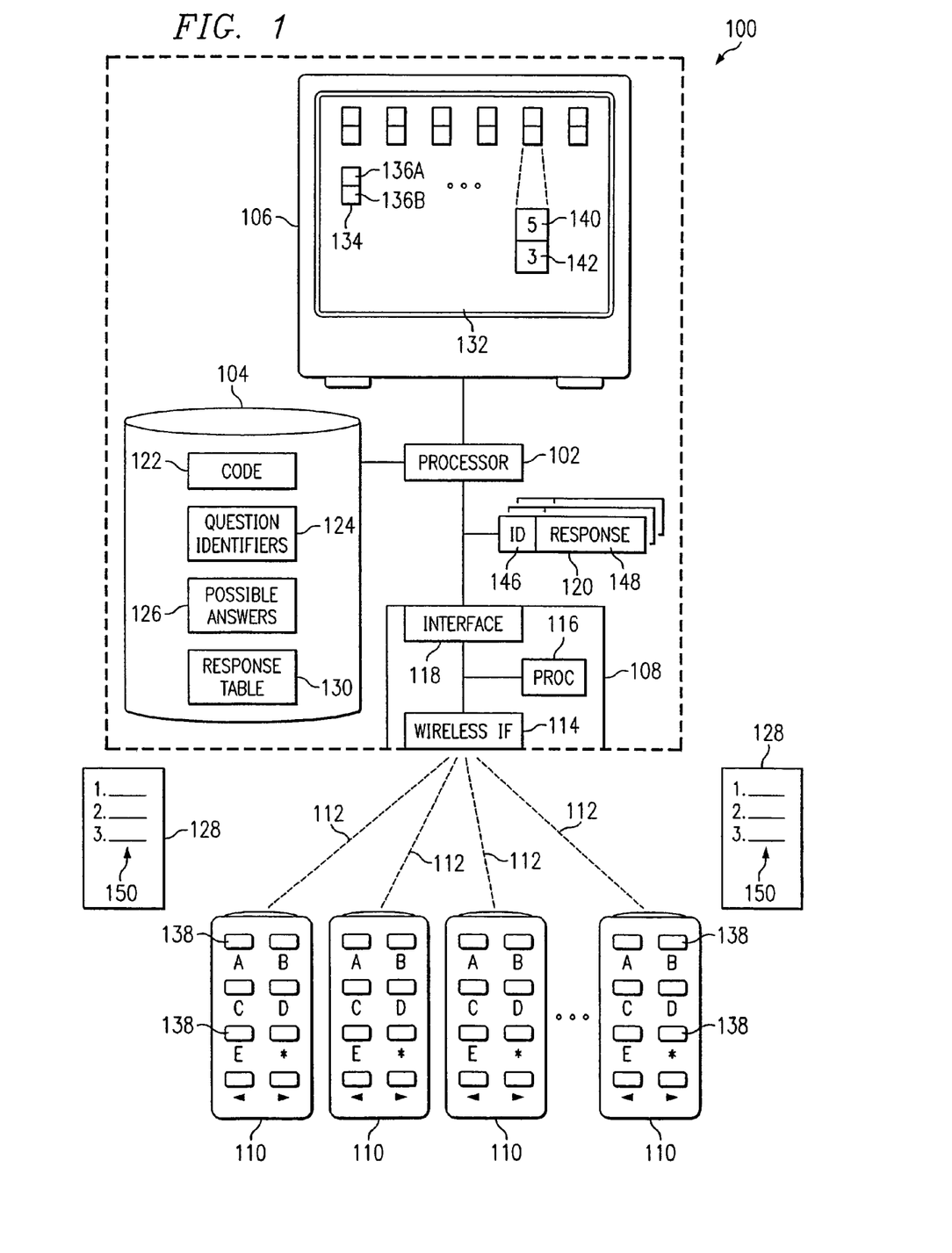
FIG. 1 illustrates a communication system in accordance with the present invention.

FIG. 1 illustrates a communication system 100 including a processor 102, a memory 104, a display 106, a base station 108, and a plurality of remote units 110. Communication system 100 allows users to send messages using remote units 110 and to receive visible indication associated with the messages on display 106, typically in an education environment. An "education environment" may be a traditional classroom, environment, but may also include a meeting, a focus group, or any other gathering in which an instructor or moderator seeks responses from the group.

Processor 102 controls the operation of system 100. Processor 102 may include microprocessors, microcontrollers, or any other suitable combination of hardware and/or software that processes information and manages components of system 100. In a particular embodiment, processor 102 is the CPU of a personal computer. In another embodiment, processor 102 is distributed among components of system 100.

Memory 104 may be any type of memory, volatile or nonvolatile, local or remote, suitable for storing information. Memory 104 may include magnetic media, optical media, CD-ROMs, DVD-ROMs, removable media, or any other suitable form of storage. Memory 104 stores code 122 executed by processor 102 to control the overall operation of system 100. Memory 104 also stores question identifiers 124 corresponding to questions 150, possible answers 126 to questions 150, and a response table 130 for storing responses from users of system 100.

Each question identifier 124 is associated with one of the questions 150. Questions 150 comprise any inquiry to be posed to users of remote units 110. Questions 150 may be provided to users in a preprinted form 128, displayed on display 106, or conveyed to users in any other suitable form. Questions 150 may be identified in a numeric sequence. System 100 may store questions 150 in memory 104. In a particular embodiment, each remote unit 110 can respond to a different question 150 and the sets of questions 150 can be different for each user.

Possible answers 126 include any suitable responses to questions 150. In a particular embodiment, possible answers 126 include letters to respond to a multiple choice question. Possible answers 126 typically are some form of alphanumeric response to questions 150, and may vary from question to question. Alternative forms of response include audio responses, selection of answers from a touch-sensitive screen, or any other suitable answer to question 150 that might be submitted by remote unit 110. System 100 may also designate one or more possible answers 126 as correct answers for questions 150 to facilitate automatic grading.

Code 122 represents a set of instructions executed by processor 102. Code 122 may be any form of logic, hard-wired instructions, hardware, and/or software. Code 122 processes responses and determines a current question 150 for each remote unit 110. In some embodiments, code 122 allows a user of remote unit 110 to navigate through questions 150.

Response table 130 stores responses from remote units 110. Response table 130 includes any suitable arrangement of information relating responses from remote units 110 to possible answers 126 and to question identifiers 124, such as a table, a database, an array or any other format or arrangement of information. In a particular embodiment, response table 130 may include pointers that indicate a current question 150 such that a response received from a particular remote unit 110 will be stored as a response to that question 150. Response table 130 may also include a flag indicating when a remote unit has submitted a response to all questions 150.

Display 106 displays information to users of remote units 110. Display 106 may include a monitor, a projection screen, a television screen, or any other suitable method for visually displaying information. Display 106 may be a single display simultaneously visible to all users of remote units 110. In some embodiments, display 106 includes a graphical user interface (GUI) 132. GUI 132 may be divided into sections 134, each with a first portion 136A and a second portion 136B. First portion 136A displays an identifier 140 corresponding to one of remote units 110, while second portion 136B displays a question identifier 142 for a current question 150 for which a response is expected from remote unit 110. Display 106 can display a wide variety of information that might be useful to users, including questions 150, status information for a particular question 150, and even responses to questions 150.

Base station 108 receives signals from remote units 110. In a particular embodiment, base station 108 may include a wireless interface 114, a processor 116, and a computer interface 118. Wireless interface 114 includes an antenna, detector or other suitable component to receive wireless signals 112 from remote units 110 and to convert the wireless signals 112 into messages. Processor 116 includes a microprocessor, a microcontroller, or any other suitable arrangement of hardware and/or software usable to process information. Processor 116 handles routing of messages received from remote units 110, including moving or rerouting messages, requesting resubmission, rejecting messages during high traffic periods, or performing any other suitable routing function. Processor 116 also reformats messages into a suitable form. Processor 116 communicates messages from base station 108 to processor 102 via interface 118. Interface 118 may include any port or connection, real or virtual, that allows base station 108 to communicate messages to processor 102. Although base station 108 has been shown as a wireless system, it is understood that base station 108 may also receive any type of suitable messages from remote units 110, including electromagnetic signals over wires, light-based signals, audio signals, or any other suitable method for conveying information from remote unit 110 to base station 108. In such alternative embodiments, wireless interface 114 would take the form of any appropriate interface 114 for the type of message received.

Remote units 110 include any suitable devices for sending messages to base station 108. In a particular embodiment, the user of remote unit 110 pushes one of several buttons 138 on remote unit 110, and remote unit 110 generates a wireless signal in response. Alternative embodiments of remote unit 110 may include a touch-sensitive display, a microphone for receiving audio input, or any other suitable method for user to enter information in remote unit 110. Various embodiments may include buttons 138 that are alphanumeric, symbolic (e.g., asterisks, question marks, arrows), color-coded, or otherwise distinctively marked.

In operation, processor 102 determines a current question 150 for each remote unit 110. The current question 150 may be the same for all remote units 110, referred to as "synchronous operation," or may be different for different remote units 110, referred to as "asynchronous operation." In a particular embodiment, during asynchronous operation, the user of remote unit 110 may be able to select a new question 150 using remote unit 110. An identifier 142 associated with the current question 150 is typically displayed on display 106 so that the user of each remote unit 110 will know which question 150 has been selected for that remote unit 110.

A user of remote unit 110 submits a response to the current question 150 by pressing button 138 on remote unit 110. Remote unit 110 generates a message in response to button 138 being pressed and communicates the message as signal 112. User of remote unit 110 may generally select from a wide variety of responses. For example, user may select one of the possible answers 126 for question 150. Alternatively, user may issue a command to select a new question 150 for remote unit 110. User might also inadvertently press a button 138 which is neither a possible answer 126 nor a command, in which case system 100 gives appropriate notification to user that an invalid answer has been given, as described in detail below.

Base station 108 receives signals 112 from remote units 110 through interface 114. In a particular embodiment, when multiple signals 112 arrive in a short time interval, processor 116 accepts the first signal 112 and rejects the rest. Processor 116 may also send a message to remote units 110 using interface 114. For example, processor 116 can confirm that signal 112 was received by base station 108. Using information in signals 112, processor 116 interprets signal 112 as a message 120. Message 120 typically includes an identifier 146 for one of the remote units 110, as well as a response 148 sent by the remote unit 110 corresponding to a button 138 selection on remote unit 110. Processor 116 sends messages 120 to other components of system 100 using interface 118.

Processor 102 compares message 120 to possible answers 126 to the current question 150 for the remote unit 110 that sent message 120. In a particular embodiment, processor 102 determines whether a previous response to question 150 has been stored in response table 130. Processor 102 may also determine that response 148 is a command, and take appropriate action responsive to the command.

Processor 102 then displays an appropriate visual indication to user on display 106. For example, if the response 148 does not correspond to a possible answer 126, then processor 102 may cause GUI 132 to display an indication that an invalid answer has been given. If response 148 is a command, processor 102 may appropriately update display 106 by updating question identifier 142.

If response 148 corresponds to one of the possible answers 126 for question 150, processor 102 may display an appropriate indication that a valid answer has been given on display 106. In a particular embodiment, the type of indication may depend on whether a previous answer has been given to question 150. In a particular embodiment, GUI 132 displays a first visible indication if response 148 is valid and no previous response has been submitted to question 150. GUI 132 displays a second visible indication if response 148 is valid and corresponds to a previous response stored in response table 130. GUI 132 displays a third visible indication if response 148 is valid, but does not correspond with a previous answer stored in response table 130. Processor 102 stores valid responses in response table 130. Upon receiving a valid response, processor 102 automatically increments to the next question 150 in a sequence of questions 150 and displays the identifier 142 for the new question 150 on display 106.

In certain embodiments, processor 102 may monitor the progress of the user of each remote unit 110 on questions 150. Once processor 102 receives a complete set of valid responses, processor 102 may compare responses in response table 130 to a set of correct answers to determine a score for the complete set.

Figures 2A, 2B, 2C:
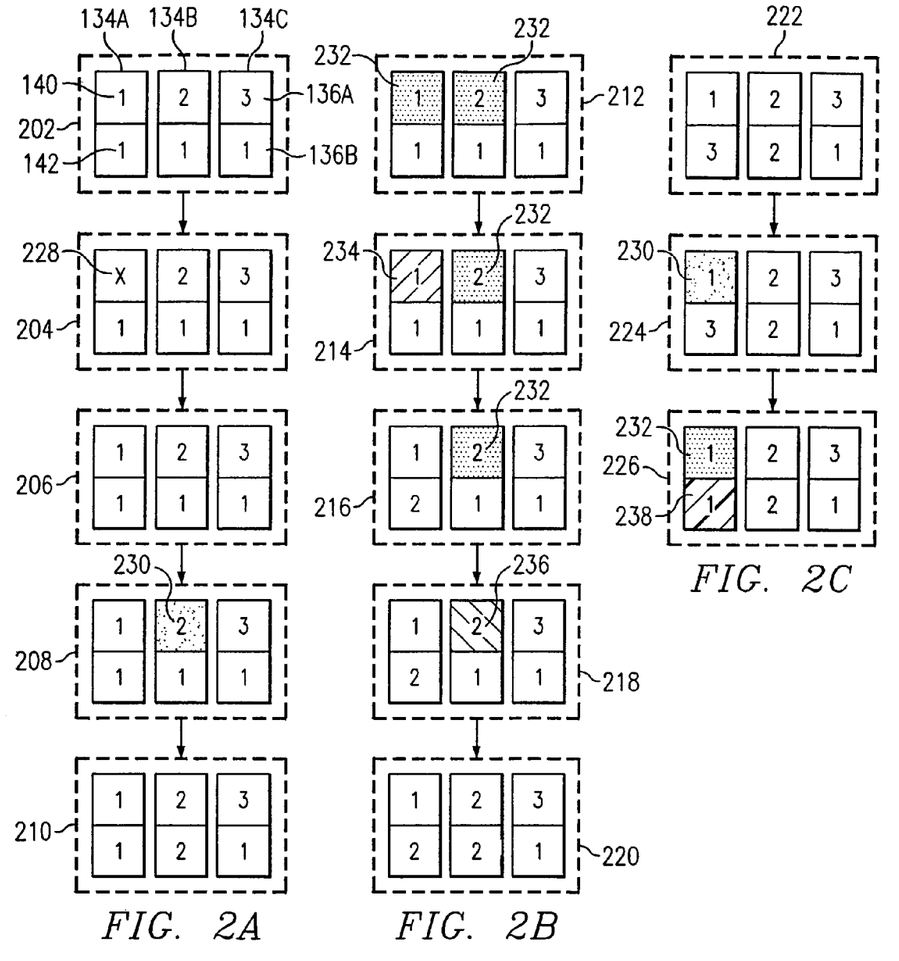
FIGS. 2A-2C illustrate examples of a graphical user interface in the communication system.

FIGS. 2A-2C show frames illustrating displays of a particular embodiment of GUI 132. In particular, GUI 132 includes sections 134 corresponding to users of remote units 110. Each section 134 includes a first portion 136A and a second portion 136B. First portion 136A shows a remote unit identifier 140 corresponding to a particular remote unit 110. Second portion 136B shows a question identifier 142 corresponding to a number for a current question 150. Frame 202 shows a possible initial display for system 100. In this initial display for three users, the question identifier 142 for each remote unit 110 corresponds to the first question 150. In a particular embodiment, portions 136A and 136B of each section 134 may be a particular color.

In frame 204, remote user one has entered an invalid answer to question one. System 100 responds by displaying an "INVALID ANSWER" indication 228. The INVALID ANSWER indication 228 may be any suitable visible indication to user. As shown in frame 204, indication 228 may be an X flashed in first portion 136A of section 134A. In a particular embodiment, indication 228 may be associated with a color, such as red.

After INVALID ANSWER indication 228 has been displayed, the display reverts to its initial state, as shown in frame 206. It is also possible for INVALID ANSWER indication 228 to remain on the screen until a valid answer has been entered. Next, frame 208 shows that remote user two has entered a valid answer to question one. In response, display flashes a "VALID ANSWER" indication 230, for example, the color blue, which indicates that a valid answer to question one has been given. Since a valid answer to question one has been given, the question identifier 142 for remote user two in second portion 136B increments to the next question as shown in frame 210.

FIG. 2B shows an example of remote users one and two returning to a previous question (question one) for which each has already submitted a valid response. As shown in frame 212, first portions 136A of section 134A and 134B display an "ANSWERED" indication 232. This indicates to a user that the current question has already been answered. In a particular embodiment, ANSWERED indication 232 takes the same form as VALID ANSWER indication 230, but they can equally well take different forms.

Frame 214 shows remote user one changing a previous answer to question one. First portion 136A of section 134A displays a "CHANGED ANSWER" indication 234, indicating that remote user one has changed the previous answer. CHANGED ANSWER 234 indication may be a color, such as yellow. Since a valid answer to question one has been received, the question identifier 142 in second portion 136B of section 134A increments to the next question, as shown in frame 216. Since remote user one has not answered question two, ANSWERED indication 232 is not present in first portion 136A of section 134A. Remote user two is still on question one, so first portion 136A of section 134B displays ANSWERED indication 232.

In frame 218, remote user two confirms the previous answer to question one. First portion 136A of section 134B displays a "SAME ANSWER" indication 236. SAME ANSWER indication 236 may be a color different from CHANGED ANSWER indication 234, for example, green. After the confirmed answer has been received, question identifier 142 in second portion 136B of section 134B increments for remote user two, as shown in frame 220.

FIG. 2C shows an example of one of the remote users completing a three question examination. Frame 222 shows that remote user one is on the last question of the examination, indicated by question number three displayed in second portion 136B of section 134A. In frame 224, remote user one submits a valid answer to question three, as indicated by VALID ANSWER indication 230 in first portion 136A of section 134A.

Frame 226 then shows a display indicating that the examination has been completed. Because question three was the last question in the sequence, question number one is displayed in second portion 136B of section 134A, indicating that the examination is completed and remote user has returned to the beginning of the examination. Second portion 136B also displays an "ALL ANSWERED" indication 238, indicating that remote user one has submitted a valid answer to all questions. "ALL ANSWERED" indication 238 may include a color. In a particular embodiment, the color of ALL ANSWERED indication 238 is the same as the color used for VALID ANSWER indication 230 and ANSWERED indication 232. This has the advantage of associating a color with validly responding to questions. Since all questions have been answered including the current question, the ANSWERED indication 232 is displayed in first portion 136A of section 134A.

Figure 3:
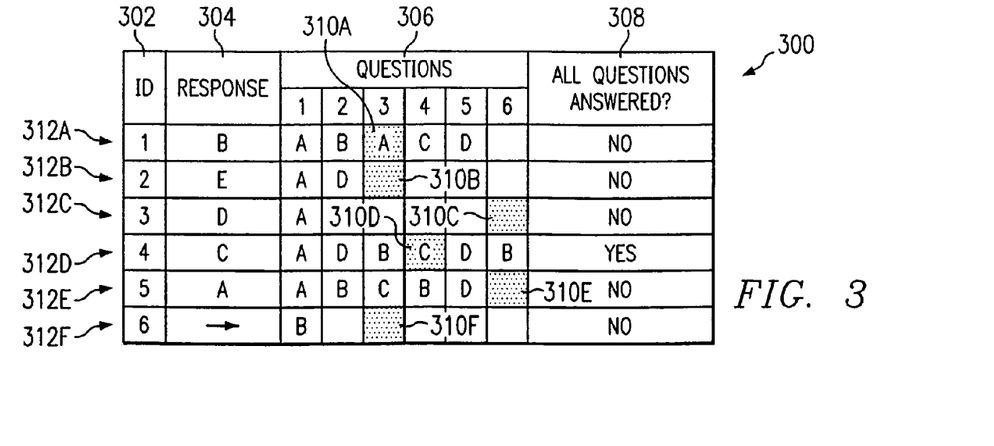
FIG. 3 is an exemplary table storing responses received from a remote unit in the communication system.

FIG. 3 illustrates response table 300 stored in memory 104 of system 100 that includes an identifier column 302 of identifiers 140 for remote units 110. Response column 304 shows the current response to a current question received from remote unit 110. Question matrix 306 includes stored answers submitted by each remote unit 110 for each question. Although question matrix 306 is shown one set of six questions for all of the users, alternative embodiments allow each user to respond to an individualized set of questions that may differ in number and/or content from the questions presented to other users. The "ALL ANSWERED" flag 308 indicates whether or not a particular remote user has submitted a valid response to all the questions in that user's examination, which, in this case, is a valid response to all six questions.

Each row 312 includes a pointer 310 in question matrix 306 shown as a shaded box, which indicates the current question to which the response from remote unit 110 applies. Questions for each remote unit 110 may be selected by updating pointer 310. System 100 may update pointer 310 in response to commands received from remote unit 110, and may automatically increment pointer 310 to the next question in the sequence once a valid answer has been received from the user of remote unit 110.

Row 312A shows that remote user one submits a response of "b" for question three (indicated by pointer 310A). The previously stored response for question three was "a". System 100 displays CHANGED ANSWER indication 234, stores the response for question three, and moves pointer 310A to question four. Since all questions have not yet been answered, there is no need to update ALL ANSWERED flag 308A.

Turning to row 312B, remote user two submits a response of "e" to question three. If answer choices a-d are valid answer choices for question three, system 100 displays INVALID ANSWER indication 228 to remote user two. Since no valid answer to question three was given, system 100 does not move pointer 310B to the next question and does not update ALL ANSWERED flag 308B.

Row 312C shows that remote user three submits a response of "d" to question six. Since remote user three has not submitted a previous answer to question six, system 100 displays a VALID ANSWER indication 230 to remote user three. Since question six is the end of the question sequence, pointer 310C returns to the beginning of the sequence at question one. Because the intervening questions in the sequence remain unanswered, system 100 does not update ALL ANSWERED flag 308C.

In row 312D, remote user four has already answered all questions. Thus, ALL ANSWERED flag 308D has the value "Yes," and ALL ANSWERED indication 238 is displayed by system 100. Remote user four submits the answer "c" for question four, and since this answer matches remote user's previous answer, system 100 displays SAME ANSWER indication 236 to remote user four.

Row 312E illustrates remote user five completing the set of questions. Remote user five enters the response "a," a valid response for question six. System 100 stores the response for question six and moves pointer 310E back to the beginning of the sequence. System 100 also displays VALID ANSWER indication 230 to remote user five. Since all of the questions have now been answered, ALL ANSWERED flag 308E is set to "Yes," and ALL ANSWERED indication 238 is displayed to user five.

Row 312F shows an example of remote user six moving from question to question. Remote user six's response to question three is a command, right arrow, corresponding to selecting the next question in the sequence. In response to the command, system 100 moves pointer 312F to the next question in the sequence. Since all of the questions have not yet been answered by remote user six, ALL ANSWERED flag 308F is not updated.

Figure 4A:
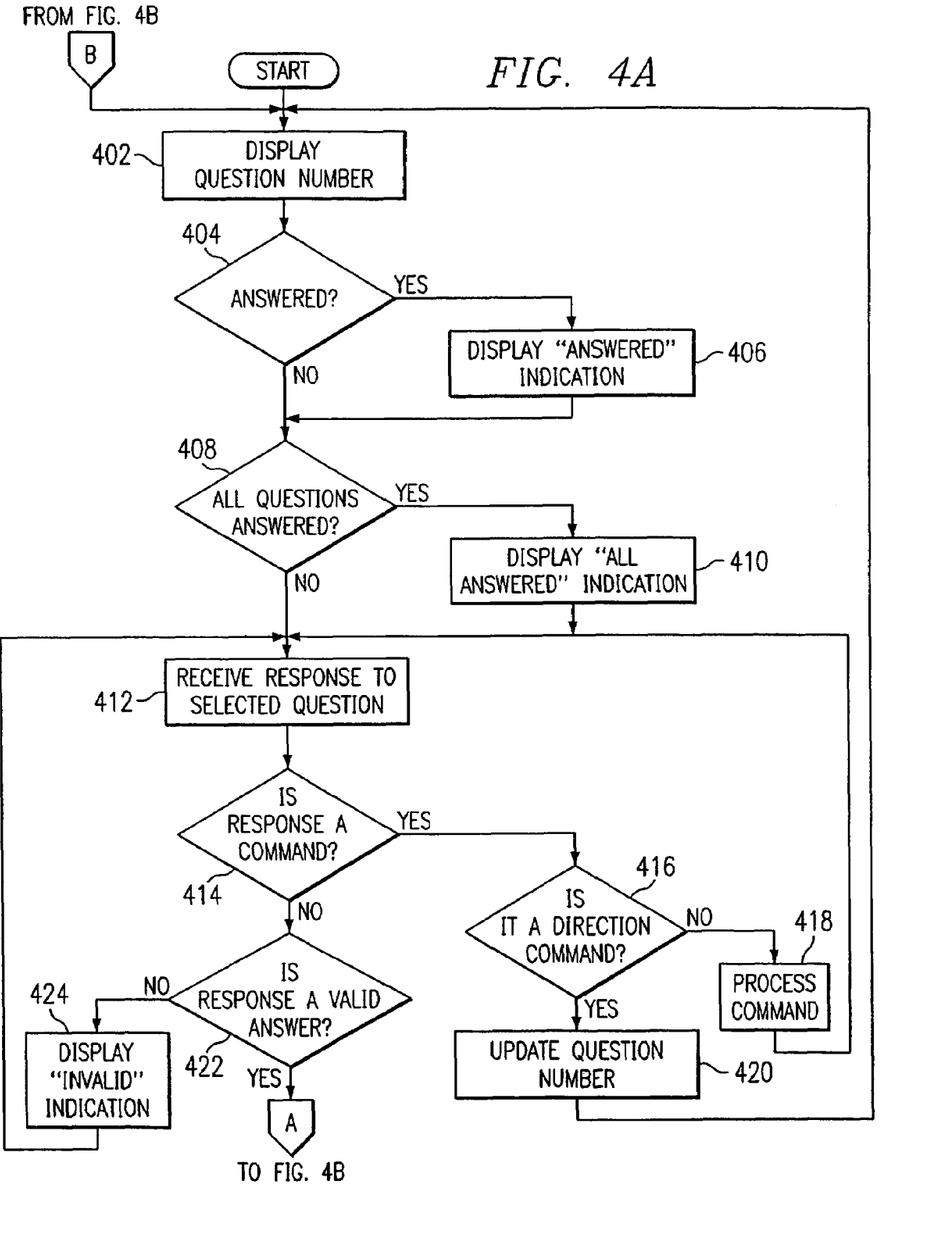
FIG. 4 is a flowchart illustrating a method for receiving responses from a remote unit.
Figure 4B:
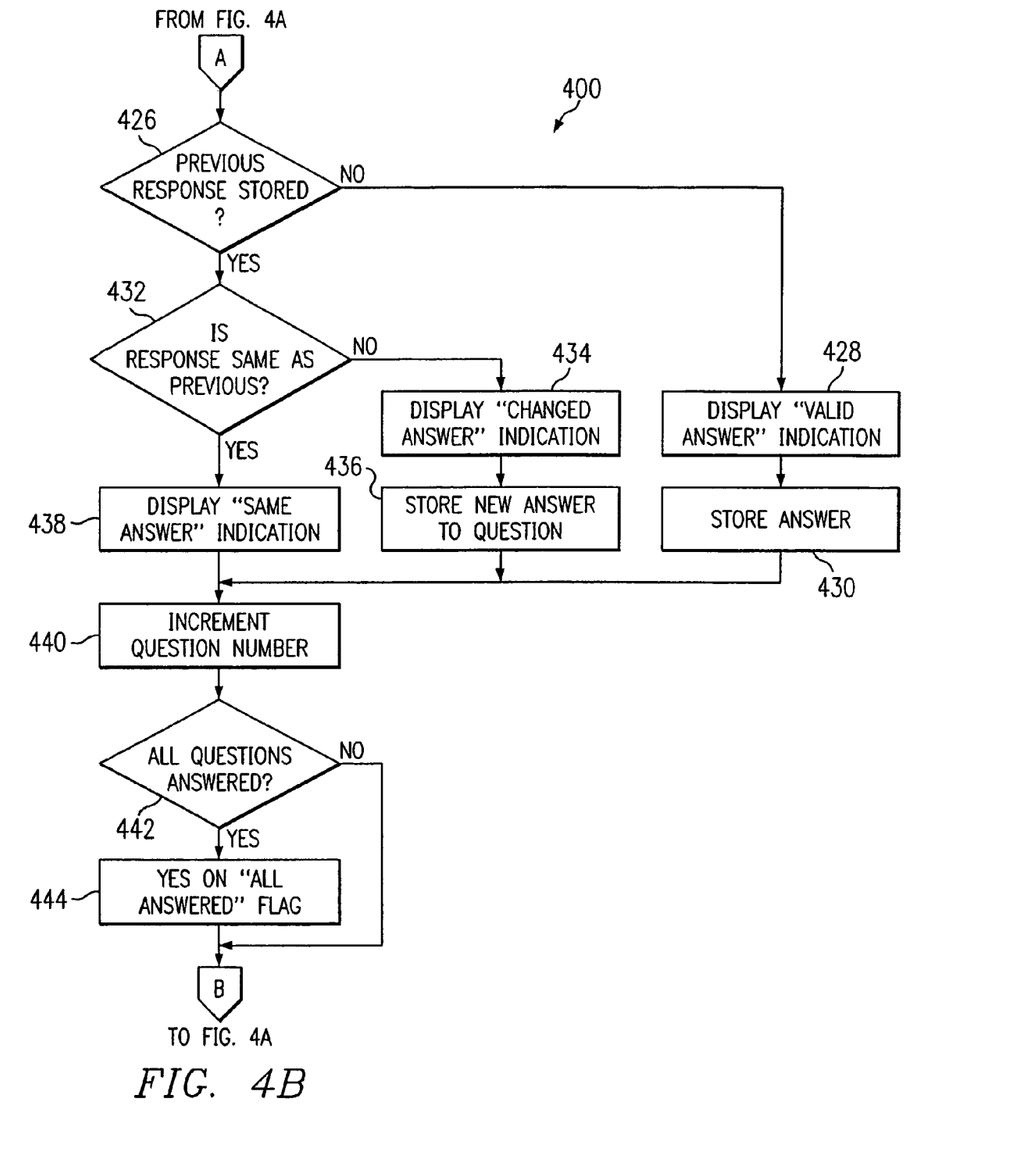

FIG. 4 is a flowchart showing a method for receiving a message from remote units 110 and processing the message. System 100 displays a question identifier 142 for a current question 150 selected for the remote unit on display 106 at step 402. System 100 determines whether question 150 has been answered at step 404. If question 150 has been answered, then system 100 displays ANSWERED indication 232 on display 106 at step 406. At step 408, system 100 determines whether or not all questions 150 have been answered. If all questions 150 have been answered, system 100 displays "ALL ANSWERED" indication 238 on display 106 at step 410.

Base station 108 receives a response to the current question 150 from the remote unit at step 412. System 100 then determines whether the response is a command at step 414. If the response is a command, system 100 determines if the command is a direction command at step 416. A direction command is an instruction from the user of remote unit 110 to move to a new current question 150. If the command is a direction command, system 100 updates the question identifier 142 for the remote unit at step 420 in response to the command and returns to the beginning of flowchart 400. If the command is not a direction command, processor 102 takes action in response to the command at step 418. One example of such a command might be a command to cycle through the question numbers to indicate the number of questions 150 on the examination. Once the command is executed, system 100 prepares to receive another response at step 412.

If the response is not a command, system 100 determines whether the response is a valid answer at step 422. If the response is not a valid answer, system 100 displays INVALID ANSWER indication 228 on display 106 at step 424. System 100 then prepares to receive another response to the current question 150 at step 412.

If the response is a valid answer, system 100 checks to see whether there is a previous response stored at step 426. If no answer has been stored, system 100 displays a VALID ANSWER indication 230 on display 106 at step 428, and then stores the answer in memory 104 at step 430. If a previous response has been received, system 100 checks to see whether the current response corresponds to the previous response at step 432. If the responses do correspond, system 100 displays SAME ANSWER indication 236 at step 438. If the responses do not correspond, system 100 displays CHANGED ANSWER indication 234 at step 434, and system 100 then stores the new response to the current question 150 in memory 104 at step 436.

After a valid response has been received, system 100 increments question identifier 142 for remote unit 110 at step 440. To incrementing question identifier 142, system 100 moves to the next question 150 in the sequence, or if the sequence is complete, returns to the first question 150 in the sequence. System 100 determines if all of the questions 150 have been answered by remote unit 110 at step 442. If all of the questions 150 have been answered, system 100 updates the ALL ANSWERED flag 308 to "Yes" at step 444. After question identifier 142 and ALL ANSWERED flag 308 have been appropriately updated, system 100 returns to the beginning of flowchart 400.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for communicating in an education environment, comprising:
    presenting a common display simultaneously viewable by users of a plurality of remote units, the common display including a plurality of remote unit identifiers each associated with a respective remote unit;
    receiving from a particular remote unit a message identifying the particular remote unit and a response to a particular one of a plurality of questions;
    associating on the common display a remote unit identifier associated with the particular remote unit with a first current question; and
    updating the common display to associate the remote unit identifier with a second current question to allow a user of the particular remote unit to progress through the plurality of questions independently with respect to users of other remote units.

2. The method of claim 1, wherein updating the common display to associate the remote unit identifier with a second current question comprises updating the common display in response to receiving the message identifying the response to the particular one of the plurality of questions from the particular remote unit.

3. The method of claim 1, further comprising, in response to receiving messages identifying responses to various questions from various remote units of the plurality of remote units, updating the common display to associate the remote unit identifier for each of the various remote units with a respective current question for each of the various remote units.

4. The method of claim 1:
    further comprising presenting on the common display a plurality of question identifiers each associated with a respective question of the plurality of questions; and
    wherein associating on the common display the remote unit identifier associated with the particular remote unit with a first current question comprises associating on the common display the remote unit identifier associated with the particular remote unit with the question identifier associated with the first current question.

5. The method of claim 1, further comprising presenting on the common display a plurality of question identifiers each associated with at least one of the remote unit identifiers.

6. The method of claim 1, wherein updating the common display to associate the remote unit identifier with a second current question to allow a user of the particular remote unit to progress through the plurality of questions independently with respect to users of other remote units comprises updating the common display to associate the remote unit identifier with a second current question to allow a user of the particular remote unit to progress through the plurality of questions independently with respect to users of other remote units by viewing the common display and without reference to visual feedback from the particular remote unit.

7. The method of claim 1, further comprising providing the plurality of questions to the users of the plurality of remote units in printed form.

8. The method of claim 1, wherein the common display does not display the response to the particular one of a plurality of questions received from the particular remote unit.

9. The method of claim 1, wherein:
    each of the plurality of questions includes a plurality of possible answers;
    the response to the particular one of the plurality of questions corresponds to one of the plurality of possible answers of the particular one of the plurality of questions; and
    updating the common display to associate the remote unit identifier with a second current question to allow a user of the particular remote unit to progress through the plurality of questions independently with respect to users of other remote units comprises updating the common display for the user of the particular remote unit to progress to the second current question upon determining that the response to the particular one of the plurality of questions corresponds to one of the plurality of possible answers of the particular one of the plurality of questions.

10. The method of claim 1, further comprising:
    receiving from the particular remote unit a response to a question previously answered by the particular remote unit; and
    presenting on the common display an indication that the response to the question previously answered by the particular remote unit was received.

11. The method of claim 10, wherein presenting on the common display an indication that the response to the question previously answered by the particular remote unit was received comprises presenting on the common display an indication that the response to the question previously answered by the particular remote unit does not correspond to a previous response received from the particular remote unit for the question.

12. Logic for communicating in an education environment, the logic encoded in computer readable media and operable when executed to:
    present a common display simultaneously viewable by users of a plurality of remote units, the common display including a plurality of remote unit identifiers each associated with a respective remote unit;
    receive from a particular remote unit a message identifying the particular remote unit and a response to a particular one of a plurality of questions;

associate on the common display a remote unit identifier associated with the particular remote unit with a first current question; and update the common display to associate the remote unit identifier with a second current question to allow a user of the particular remote unit to progress through the plurality of questions independently with respect to users of other remote units.

13. The logic of claim 12, wherein updating the common display to associate the remote unit identifier with a second current question comprises updating the common display in response to receiving the message identifying the response to the particular one of the plurality of questions from the particular remote unit.

14. The logic of claim 12, further operable, in response to receiving messages identifying responses to various questions from various remote units of the plurality of remote units, to update the common display to associate the remote unit identifier for each of the various remote units with a respective current question for each of the various remote units.

15. The logic of claim 12:
further operable to present on the common display a plurality of question identifiers each associated with a respective question of the plurality of questions; and
wherein associating on the common display the remote unit identifier associated with the particular remote unit with a first current question comprises associating on the common display the remote unit identifier associated with the particular remote unit with the question identifier associated with the first current question.

16. The logic of claim 12, further operable to present on the common display a plurality of question identifiers each associated with at least one of the remote unit identifiers.

17. The logic of claim 12, wherein updating the common display to associate the remote unit identifier with a second current question to allow a user of the particular remote unit to progress through the plurality of questions independently with respect to users of other remote units comprises updating the common display to associate the remote unit identifier with a second current question to allow a user of the particular remote unit to progress through the plurality of questions independently with respect to users of other remote units by viewing the common display and without reference to visual feedback from the particular remote unit.

18. The logic of claim 12, wherein the common display does not display the response to the particular one of a plurality of questions received from the particular remote unit.

19. The logic of claim 12, wherein:
each of the plurality of questions includes a plurality of possible answers;
the response to the particular one of the plurality of questions corresponds to one of the plurality of possible answers of the particular one of the plurality of questions; and
updating the common display to associate the remote unit identifier with a second current question to allow a user of the particular remote unit to progress through the plurality of questions independently with respect to users of other remote units comprises updating the common display for the user of the particular remote unit to progress to the second current question upon determining that the response to the particular one of the plurality of questions corresponds to one of the plurality of possible answers of the particular one of the plurality of questions.

20. The logic of claim 12, further operable to:
receive from the particular remote unit a response to a question previously answered by the particular remote unit; and
present on the common display an indication that the response to the question previously answered by the particular remote unit was received.

21. The logic of claim 20, wherein presenting on the common display an indication that the response to the question previously answered by the particular remote unit was received comprises presenting on the common display an indication that the response to the question previously answered by the particular remote unit does not correspond to a previous response received from the particular remote unit for the question.

22. A communication system, comprising:
a common display simultaneously viewable by users of a plurality of remote units, the common display including a plurality of remote unit identifiers each associated with a respective remote unit;
a base station to receive from a particular remote unit a message identifying the particular remote unit and a response to a particular one of a plurality of questions; and
a processor to:
associate on the common display a remote unit identifier associated with the particular remote unit with a first current question; and
update the common display to associate the remote unit identifier with a second current question to allow a user of the particular remote unit to progress through the plurality of questions independently with respect to users of other remote units.

23. The system of claim 22, wherein, in response to the base station receiving the message identifying the response to the particular one of the plurality of questions from the particular remote unit, the processor is further operable to update the common display to associate the remote unit identifier associated with the particular remote unit with a second current question.

24. The system of claim 22, wherein, in response to the base station receiving messages identifying responses to various questions from various remote units of the plurality of remote units, the processor is further operable to update the common display to associate the remote unit identifier for each of the various remote units with a respective current question for each of the various remote units.

25. The system of claim 22, wherein:
the common display further comprises a plurality of question identifiers each associated with a respective question of the plurality of questions; and
the processor is further operable to associate on the common display the remote unit identifier associated with the particular remote unit with the question identifier associated with the first current question.

26. The system of claim 22, wherein the common display further comprises a plurality of question identifiers each associated with at least one of the remote unit identifiers.

27. The system of claim 22, wherein the processor is further operable to update the common display to associate the remote unit identifier with a second current question to allow a user of the particular remote unit to progress through the plurality of questions independently with respect to users of other remote units by viewing the common display and without reference to visual feedback from the particular remote unit.

28. The system of claim 22, wherein the common display is further operable not to display the response to the particular one of a plurality of questions received from the particular remote unit.

29. The system of claim 22, wherein:
each of the plurality of questions includes a plurality of possible answers;
the response to the particular one of the plurality of questions corresponds to one of the plurality of possible answers of the particular one of the plurality of questions; and
the processor is further operable to update the common display for the user of the particular remote unit to progress to the second current question upon determining that the response to the particular one of the plurality of questions corresponds to one of the plurality of possible answers of the particular one of the plurality of questions.

30. The system of claim 22, wherein:
the base station is further operable to receive from the particular remote unit a response to a question previously answered by the particular remote unit; and
the processor is further operable to indicate on the common display that the response to the question previously answered by the particular remote unit was received.

31. The system of claim 30, wherein the processor is further operable to indicate on the common display that the response to the question previously answered by the particular remote unit does not correspond to a previous response received from the particular remote unit for the question.

32. A method for communicating in an education environment, comprising:
presenting a common display simultaneously viewable by users of a plurality of remote units, the common display including a plurality of remote unit identifiers each associated with a respective remote unit and a plurality of question identifiers each associated with a respective question of a plurality of questions and each associated with at least one of the remote unit identifiers, wherein each of the plurality of questions includes a plurality of possible answers;
receiving from a particular remote unit a message identifying the particular remote unit and a response to a particular one of the plurality of questions, wherein the response to the particular one of the plurality of questions corresponds to one of the plurality of possible answers of the particular one of the plurality of questions and the common display does not display the response to the particular one of a plurality of questions received from the particular remote unit;
associating on the common display the remote unit identifier associated with the particular remote unit with a current question, wherein associating on the common display comprises associating on the common display the remote unit identifier associated with the particular remote unit with the question identifier associated with the current question;
enabling a user of the particular remote unit to progress through the plurality of questions independently with respect to users of other remote units by viewing the common display and without reference to visual feedback from the particular remote unit;
in response to receiving the message identifying the response to the particular one of the plurality of questions from the particular remote unit:
updating the common display to associate the remote unit identifier associated with the particular remote unit with a second current question;
updating the common display for the user of the particular remote unit to progress to a subsequent question upon determining that the response to the particular one of the plurality of questions corresponds to one of the plurality of possible answers of the particular one of the plurality of questions; and
updating the common display to associate the remote unit identifier for each of the various remote units with a respective current question for each of the various remote units;
receiving from the particular remote unit a response to a question previously answered by the particular remote unit; and
presenting on the common display an indication that the response to the question previously answered by the particular remote unit was received and does not correspond to a previous response received from the particular remote unit for the question.

* * * * *